F. O. MACKEY.
AUTOMOBILE.
APPLICATION FILED FEB. 14, 1920.
1,364,292.
Patented Jan. 4, 1921.
4 SHEETS—SHEET 1.
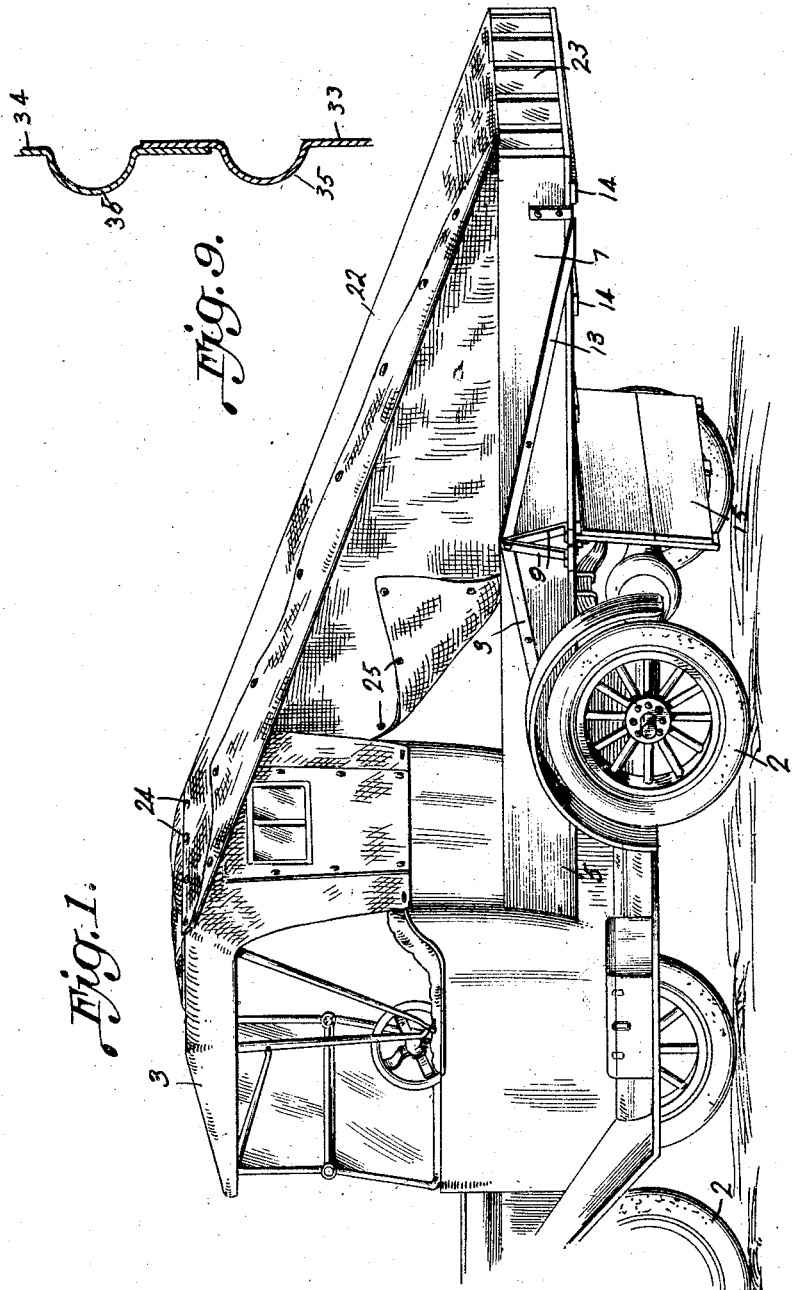
WITNESSES
R. F. Rousseau
C. E. Trainor
INVENTOR
F. O. Mackey,
BY
ATTORNEYS

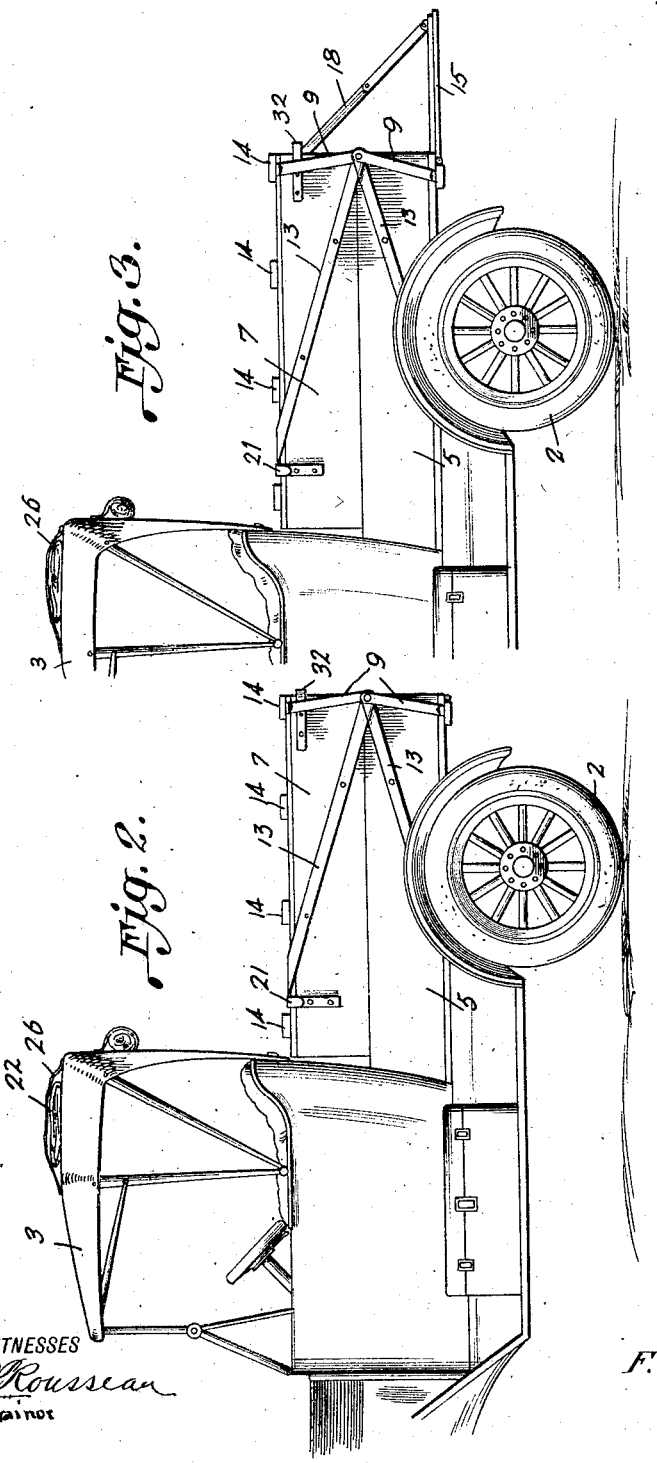

F. O. MACKEY.
AUTOMOBILE.
APPLICATION FILED FEB. 14, 1920.
1,364,292.
Patented Jan. 4, 1921.
4 SHEETS—SHEET 3.
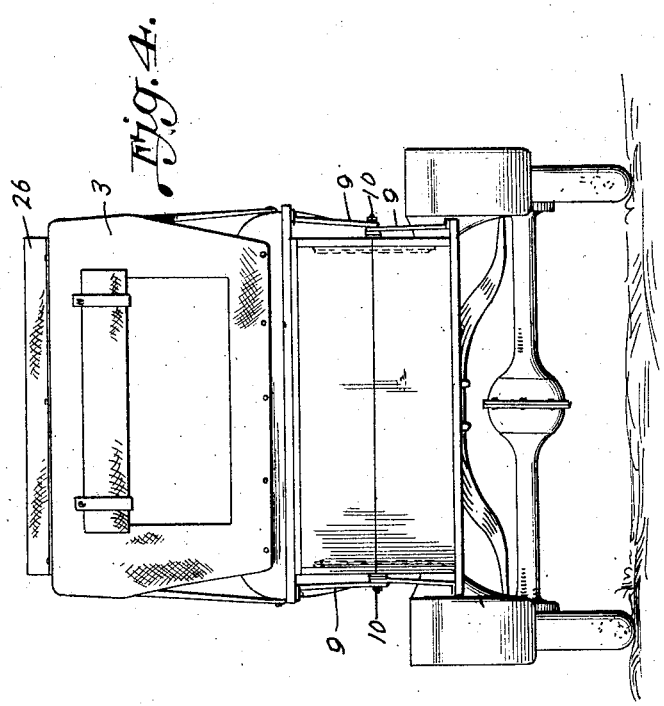
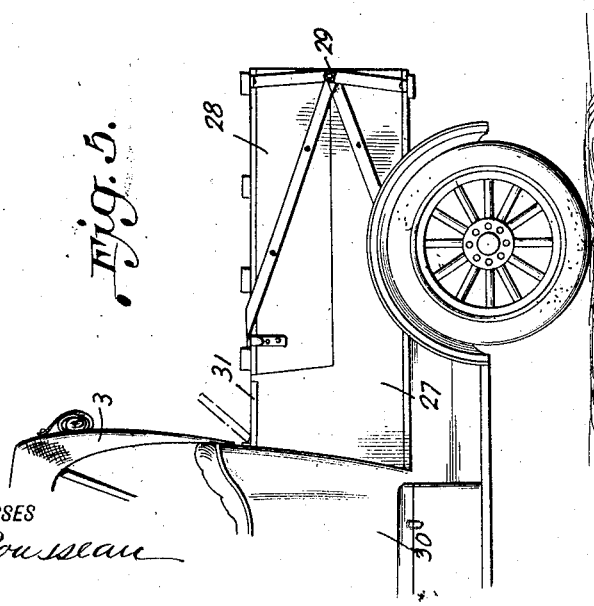
WITNESSES
INVENTOR
F. O. Mackey,
BY
ATTORNEYS F. O. MACKEY.
AUTOMOBILE.
APPLICATION FILED FEB. 14, 1920.
1,364,292.
Patented Jan. 4, 1921.
4 SHEETS—SHEET 4.
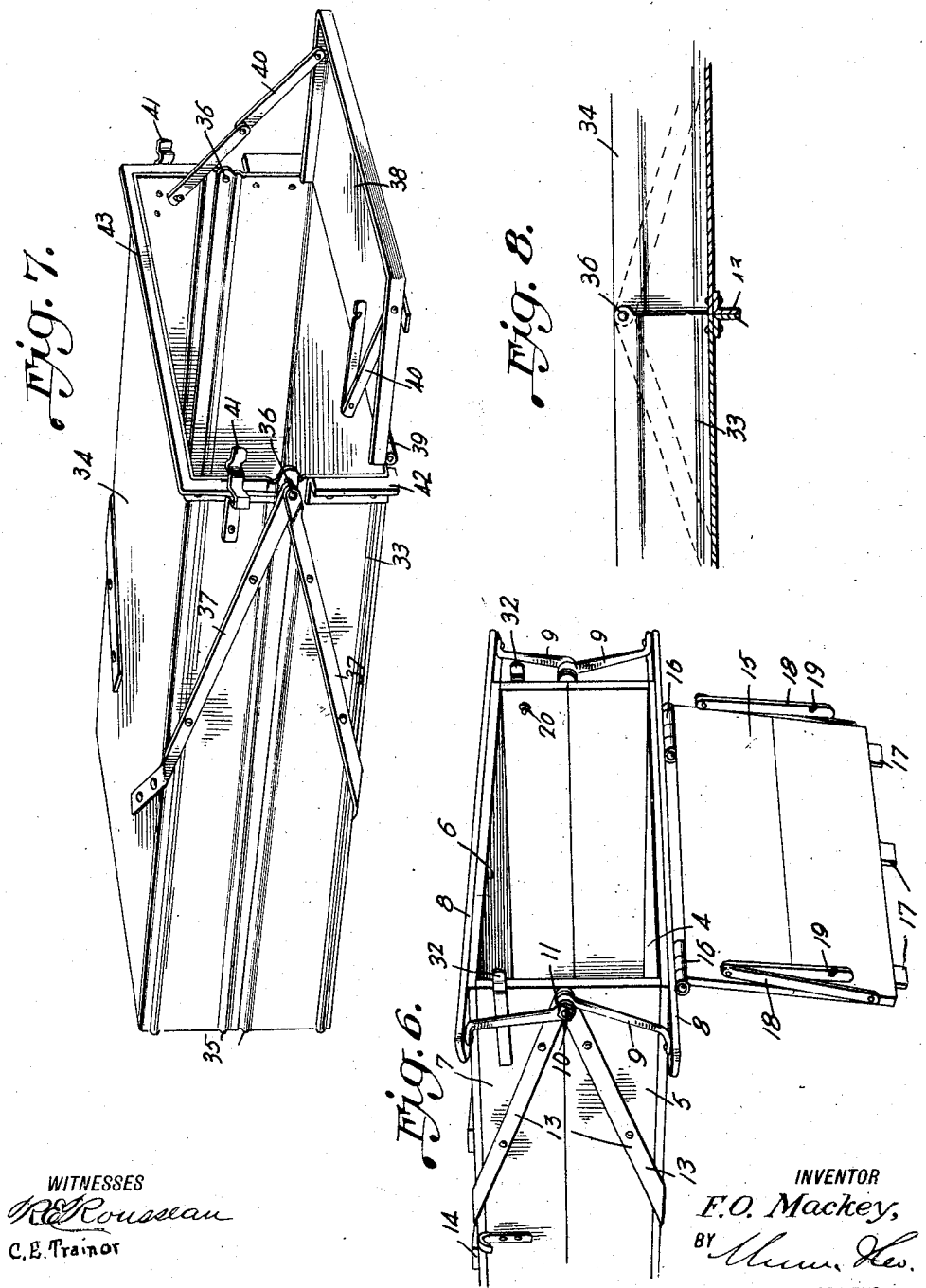
WITNESSES
R. E. Rousseau
C. E. Trainor
INVENTOR
F. O. Mackey,
BY
ATTORNEYS

UNITED STATES PATENT OFFICE.

FRANKLIN ORVILLE MACKEY, OF EASTLAND, TEXAS.

AUTOMOBILE.

1,364,292. Specification of Letters Patent. Patented Jan. 4, 1921.

Application filed February 14, 1920. Serial No. 358,778.

*To all whom it may concern:*

Be it known that I, FRANKLIN ORVILLE MACKEY, a citizen of the United States, and a resident of Eastland, in the county of Eastland and State of Texas, have invented certain new and useful Improvements in Automobiles, of which the following is a specification.

My invention is an improvement in automobiles, and has for its object to provide means in connection with an automobile, for providing mechanism which may be extended to form a tent bed, or folded into small compass, and wherein the folding bed may be utilized to store camp equipments, when not used as a bed.

In the accompanying drawings:—

Figure 1 is a perspective view of an automobile provided with the improvement, showing the bed extended and the tent in place;

Fig. 2 is a partial side view with the bed folded;

Fig. 3 is a similar view with the rear flap open;

Fig. 4 is a rear end view;

Fig. 5 is a side view similar to Fig. 2;

Fig. 6 is a partial perspective view looking from the rear, with the rear flap entirely open;

Fig. 7 is a perspective view looking from the rear of a modified construction;

Fig. 8 is a sectional view through the hinge of the construction shown in Fig. 7; and Fig. 9 is an enlarged section through the meeting edges of the sections shown in Fig. 7.

The present embodiment of the invention is shown in connection with an automobile, comprising the usual body 1 supported by the front and rear wheels 2, and having the top 3. The improvement comprises a channel-shaped body consisting of a bottom wall 4 and side walls 5 and a channel-shaped cover comprising a body 6 and side walls 7.

In the embodiment shown in Figs. 1 to 6, inclusive, cross bars 8 are arranged transversely of the bodies of the sections of the bed at their rear ends, the said cross bars being extended beyond the side walls of the sections, and a hinge arm 9 is secured to the extended ends of each cross bar. These hinges have bearings at the ends remote from the cross bars, which are pivotally connected by bolts, each bolt being engaged by a nut 11 at the outer sides of the arms. The bolts 10 are mounted in the ends of straps 12 and 13, respectively, which are secured to the side walls, and to the bodies of the sections, the said straps being inclined, as shown in Fig. 6, that is they diverge from each other from the bolt 11. Since the straps are securely fixed to the sections, they provide a support for the bolts 10, which hinge the sections together, so that the sections may be folded in the position of Fig. 6, or extended into the position of Fig. 1.

Preferably, the body of the outer section is reinforced by cross bars 14, and the rear flap or gate 15 is hinged to the body of the lower sections 4—5 by means of hinges 16, in such manner that it will take the position of Fig. 1, or that of Fig. 2. This flap or gate which in the present instance is composed of two boards connected by cleats or cross bars 17 may be held in horizontal position by means of folding braces 18. These braces each of which consists of two sections, have one section pivoted to the end of the gate, and the other section has a notch or recess 19, which is adapted to engage the bolt 20 on the side wall 7 of the upper section to hold the flap or gate in horizontal position.

Hooks 21 are connected with the side walls 7 of the upper section at the end remote from the hinge, and a cover is provided for use with the bed when unfolded. The said cover is a sheet 22 of suitable length to extend from the rear of the top 3 to that end of the upper section which is rearmost when the bed is unfolded, and referring to Fig. 1 it will be observed that this rear end is closed by a wall 23, which is shown as paneled in the present instance. The sheet 22 is connected to the top 3 by means of buttons 24 on the top and eyes on the sheet, and it has side curtains 25 which are shaped to fit between the edges of the sheet 22 when stretched between the wall 23 and the top, and the side walls 5 and 7 of the sections. The side wall sections and the sides of the top 3 have buttons which may be engaged by button-holes 25 on the side curtains. When the sheet 22 is stretched, as shown in Fig. 1, and the side curtains are buttoned in place, the bed will be covered by a canopy or tent, and by unbuttoning the side flaps access is had to the bed. The connections between the sheet 22, the side curtains, the bed and the top are preferably snap fasteners, such as are used upon carriage tops. When not in use, the side curtains are bolted back upon the sheet 22, and the sheet is rolled up or folded, as shown in Figs. 2 and 3, and arranged upon the top 3 of the automobile, being held in place by a cover sheet 26 which is suitably connected at its side edges with the top 3, one of said edges being detachable to permit the curtain to be stretched.

In Fig. 5 there is shown a slightly modified construction. In this arrangement, the lower section 27 which is channel-shaped as is also the upper section 28 are hinged together in the same manner as are the section 4—5 and 6—7, the hinged connections being indicated at 29. The side walls of the section 27 are however of greater depth at the vehicle 30 than at their rear ends being cut away at their upper rear edges to receive the side walls of the section 28. A cover indicated at 31, may be hinged to the side walls of the section 27 in front of the section 28 to provide a door, for permitting access to the interior of the bed at the front when it is folded. As shown in Fig. 1, when the sections are unfolded, the hinged ends abut, and the braces 13 extending from the upper ends of the hinged arms 9 act as suspending members to support the outer end of the movable section. A very secure and rigid connection is thus provided. The space within the bed, that is between the sections, when they are folded provides ample storage for camping equipments, and resilient latches 32 are provided for holding the rear gate in lifted position. These latches are secured to the side walls 6—7 and engage the edges of the gate.

In the construction of Figs. 7 and 8, the sections 33 and 34 are of metal, but they are shaped similar to the sections of Fig. 1, being channel-shaped. The edges of the side walls of the sections remote from the bodies thereof are beaded adjacent to the edge, as indicated at 35, and the sections are pivotally connected by bolts or rivets 36. The side and end walls of the upper section 34 fit over the side and end walls of the lower section 33, as shown in Fig. 9, the beads limiting the movement of the sections toward each other. Inclined braces 37 corresponding to the braces 13 of Fig. 1 extend from the pivotal connection at each side, the said braces diverge from each other and are secured to the side walls and the body of the sections. The rear gate or flap 38 is hinged to the body of the lower section at 39, and this gate or flap as shown has a marginal flap at its disconnected edges. It is capable of being attached to the side walls of the upper section by means of folding braces 40 corresponding to the braces 18 of Fig. 1, and it is held in closed position by spring latches 41. Angle plates 42 and 43 are secured to the hinged ends of the sections, these angle plates on the section 33 being at the ends of the side walls, while on the section 34 they are at the end of the body and extend along the ends of the side walls as far as the latches 41. The portions of the angle plates which are perpendicular to the walls of the section abut when the sections are unfolded, as shown in Fig. 8, thus providing a secure and rigid stop for holding the sections in alinement.

In order to prepare the bed when the parts are in the position of Fig. 2, the rear gate is released and permitted to drop in the position of Fig. 1. The upper section 6—7 is now folded outwardly until it is in alinement with the section 4—5. The top may now be placed and the bed is ready for use. The arrangement provides a fair sized room at the rear of the top, and when the rear flap is in the position of Fig. 3 it may be used as a table. The bedding may be rolled up and arranged within the folded bed, and it is thus protected when not in use.

I claim:

1. In combination with an automobile body, of a sectional bed in rear of the seat, said bed consisting of a section fixed to the body and a section hinged to the first named section at the end remote from the seat to fold upon said section or to be extended into alinement therewith, said sections being channel shaped, the upper section and the flap having interengaging means for holding the flap in closed position or substantially horizontal and detachable to permit the flap to swing out of the way of the opening section.

2. In combination with an automobile, of a sectional bed, said bed consisting of a section fixed to the frame of the automobile in rear of the seat, and a section hinged to the first-named section to fold thereon or to be extended into alinement therewith, said sections being channel-shaped, and a rear closing flap hinged to the lower section, the hinged connection between the section comprising cross bars extending transversely of the sections and beyond the same at the ends of the bars, hinge arms secured to the cross bars, a pivotal connection between adjacent arms, and bracing straps pivoted at one end to the pivotal connection and diverging from each other and being secured to the sections to provide a suspension when the sections are unfolded.

FRANKLIN ORVILLE MACKEY.